No. 666,509. Patented Jan. 22, 1901.
Z. T. FURBISH.
REDUCING CHUCK.
(Application filed Apr. 6, 1900.)
(No Model.)
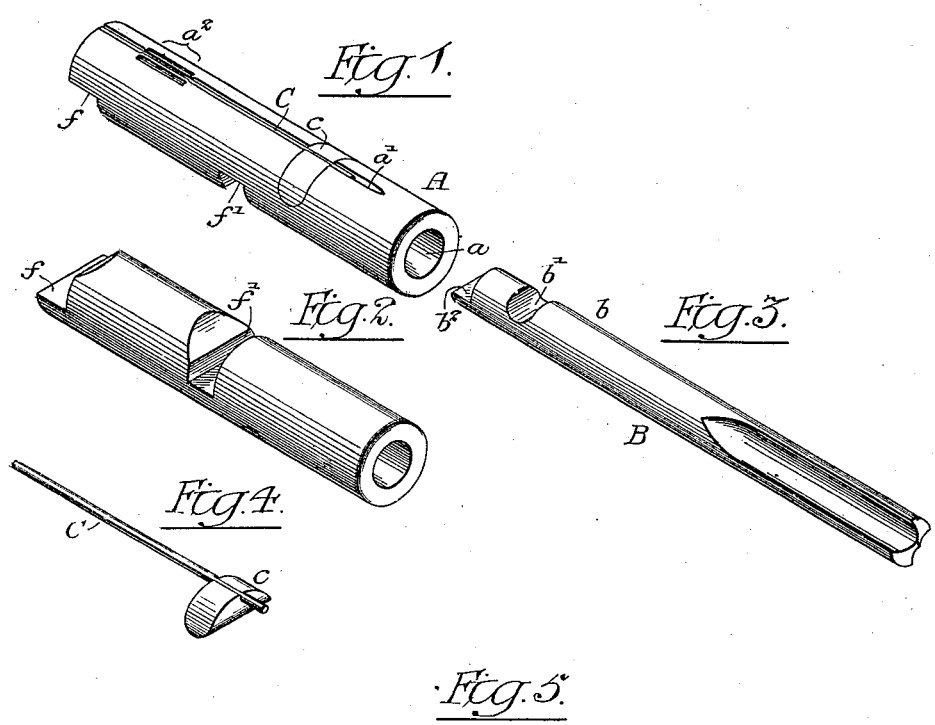
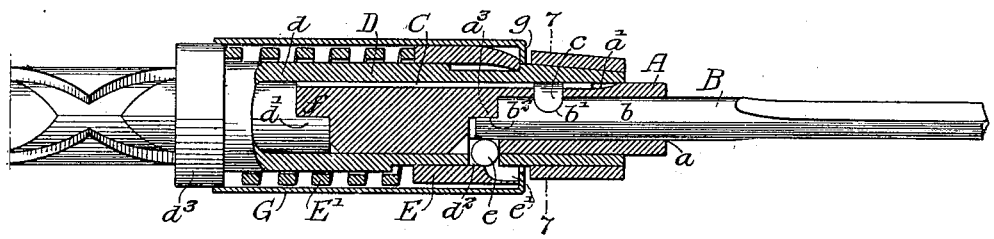
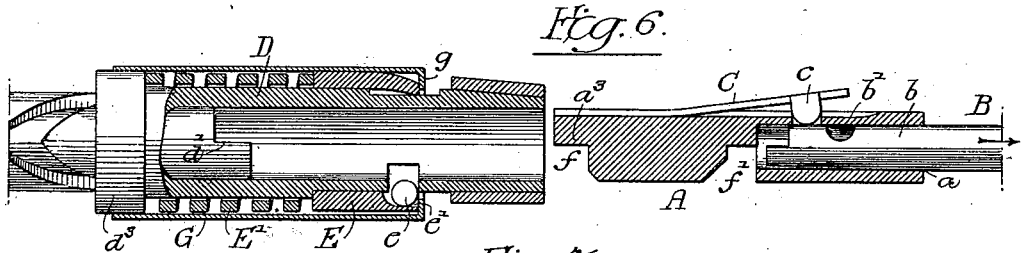
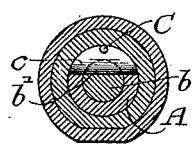
Witnesses:
Frank L. A. Graham.
[signature]
Inventor:-
Zachry T. Furbish.
by his Attorneys:-
Howson & Howson

UNITED STATES PATENT OFFICE.

ZACHRY T. FURBISH, OF PHILADELPHIA, PENNSYLVANIA, ASSIGNOR TO THE NORTH BROTHERS MANUFACTURING COMPANY, OF SAME PLACE.

REDUCING-CHUCK.

SPECIFICATION forming part of Letters Patent No. 666,509, dated January 22, 1901.

Application filed April 6, 1900. Serial No. 11,879. (No model.)

*To all whom it may concern:*

Be it known that I, ZACHRY T. FURBISH, a citizen of the United States, residing in Philadelphia, Pennsylvania, have invented certain Improvements in Reducing-Chucks, of which the following is a specification.

My invention relates to certain improvements in reducing-chucks, by which a drill having a small shank can be readily secured in a chuck of larger diameter. This object I attain in the following manner, with reference to the accompanying drawings, in which—

Figure 1 is a perspective view of my reducing-chuck. Fig. 2 is an inverted perspective view of the chuck shown in Fig. 1. Fig. 3 is a perspective view of one form of drill. Fig. 4 is a detail view of a portion of a chuck. Fig. 5 is a sectional view showing the reducing-chuck mounted in a chuck of larger size and the drill locked in place. Fig. 6 is a view similar to Fig. 5 with the spring detached. Fig. 7 is a section on the line 7 7, Fig. 5.

My invention is especially designed for use in connection with large screw-drivers or drills in which a large-sized chuck is used, so that large-sized screw-driver blades or drill-bits can be readily attached to the tool.

Ordinarily small drill-bits and small screw-driver blades have been made with large shanks shaped to fit the socket in the large chuck; but this method of manufacture is not only expensive, but the drill-bits take up an unnecessary amount of room. By my invention I provide a supplemental or reducing chuck which will fit the large chuck of the tool, and the opening in this chuck is small, so that it will accommodate the small drill-bits which are provided in this class of tools.

A is the body of the chuck, which in the present instance is cylindrical. In this body is a central opening $a$ for the shank $b$ of a drill or screw-driver bit B.

Mounted in a transverse slot in the body of the chuck A is a block $c$, which is attached to a spring-rod C. This rod rests in a longitudinal slot $a'$ in the body A of the chuck and is confined at $a^2$ to the chuck by simply crimping the metal of the body onto the rod. Other means for fastening the rod to the chuck may be resorted to without departing from my invention.

The shank of the bit B has a recess $b'$, in which fits the block $c$ when it is in position, as shown in Figs. 5 and 7, and the end of the bit is stepped at $b^2$ to fit the stepped portion $a^3$ of the body A of the chuck. The stepped portion prevents the drill from turning independently of the chuck, and the block $c$ prevents the withdrawal of the drill when the block is within the large chuck D. The block being held in place only by a spring, the bit can be readily removed when the reducing-chuck A is removed from the large chuck by simply pulling upon the bit.

The large chuck can be of any form desired. The form shown in the drawings is the one I prefer to use in connection with this drill; but I wish it understood that I do not limit myself to this construction.

D is the tubular body of the large chuck, having an offset portion $d'$, with which the stepped portion $f$ of the reducing-chuck A engages, so as to prevent the reducing-chuck from turning. The tubular body D is slotted at $d^2$, and in the slot is a bar $e$, which is forced into the notch $f'$ of the reducing-chuck A by the slide E. The slide E is cut away at $e'$ to allow the bar to fall back clear of the reducing-chuck when it is wished to detach the chuck from the large chuck.

A spring E' is mounted between the shoulder $d^3$ and the sleeve E and tends to force the sleeve forward to hold the bar in the notch of the reducing-chuck. A casing G is mounted over the sleeve and the spring E' and has a flange $g$, which rests in front of the sleeve, so that on drawing back the casing it will pull back with it the sleeve E and release the reducing-chuck.

When the chuck is released, as shown in Fig. 6, the bit can be readily released by pulling longitudinally on it, so as to force the block $c$ out of the notch $b'$, as also shown in Fig. 6.

By using this reducing-chuck I can accommodate quite a number of bits in a very small compass, and these bits can be cheaply made and readily applied.

I claim as my invention—

1. The combination of a main chuck, a reducing-chuck capable of being attached thereto, a bit fitting into the reducing-chuck, a locking device to hold said bit within the reducing-chuck, said locking device being held in place by the main chuck, substantially as described.

2. The combination with a main chuck, of a reducing-chuck, independent of but constructed to fit in the same, and adapted to secure the shank of a bit or drill, a slot in said reducing-chuck, a block fitting the slot and a spring on the block, said block retaining the bit in position in the cylindrical casing and being itself held in the slot by the main chuck, substantially as described.

3. The combination of a main chuck, a reducing-chuck, a transverse and a longitudinal slot in the body of said reducing-chuck, a block mounted to act in the transverse slot, and a spring in the longitudinal slot in said body constructed to receive within it the reducing-chuck and to confine the block in the transverse slot in said body against the pressure of said spring, substantially as described.

4. The combination of a main chuck, a reducing-chuck constructed to fit within the same, and means for retaining the said chuck in the main chuck, a bit, means on the reducing-chuck held in place by the main chuck for retaining the bit in the reducing-chuck, a slot in the said chuck to prevent the bit from turning, and a second slot constructed to receive the retaining means of the main chuck, substantially as described.

In testimony whereof I have signed my name to this specification in the presence of two subscribing witnesses.

ZACHRY T. FURBISH.

Witnesses:
WILL. A. BARR,
JOS. H. KLEIN.